United States Patent [19]

Bulso, Jr. et al.

[11] 4,022,089
[45] May 10, 1977

[54] CONTAINER TRIMMING APPARATUS

[75] Inventors: Joseph D. Bulso, Jr.; William R. Lewers, both of Canton, Ohio

[73] Assignee: Redicon Corporation, Canton, Ohio

[22] Filed: Aug. 16, 1976

[21] Appl. No.: 714,624

[52] U.S. Cl. .................................. 83/124; 83/125; 83/137; 83/685; 83/694
[51] Int. Cl.[2] ........................................ B26D 7/18
[58] Field of Search ............ 83/124, 125, 129, 137, 83/914, 685, 694

[56] References Cited

UNITED STATES PATENTS

| | | | |
|---|---|---|---|
| 2,885,913 | 5/1959 | Lescallette | 83/685 X |
| 3,910,213 | 10/1975 | Hoenig et al. | 83/685 X |

*Primary Examiner*—Willie G. Abercrombie
*Attorney, Agent, or Firm*—Reese Taylor

[57] ABSTRACT

Apparatus is disclosed for trimming the flange of a drawn metal container such as a food or beverage container so as to place it in condition for having the lid applied thereto. The apparatus includes a fixed trim punch secured to the base of a press, with a trim die stripper disposed around its upper edge. A trim die is secured to the movable upper bolster of the press for movement therewith. The trim die carries with it a pressure pad which is movable in a downward direction independently of the trim die and movable in an upward direction together with the die. The movement of the pressure pad is such that it will engage a portion of the flange of the container which is received within the trim punch, following which the trim die will continue its downward movement to shear off the excess material along the flange. The shearing motion is downward against the flange so that any burrs or irregularities which might occur on the remainder of the flange after the shearing operation will project downwardly. An ejection member is also provided for ejecting the container from the trim punch assembly after the shearing operation has been completed while the trim die stripper, being normally urged away from the base, will eject the trim ring.

9 Claims, 5 Drawing Figures

CONTAINER TRIMMING APPARATUS

BACKGROUND OF THE INVENTION

This invention relates in general to the manufacture of drawn metal containers and, in particular, relates to a means and apparatus for trimming the flange formed on the top edge thereof during the drawing operation.

DESCRIPTION OF THE PRIOR ART

In the art of container making where the container is formed from a sheet of metal, the metal is drawn from its flat condition into a cup or can shaped configuration. This operation leaves an irregularly shaped flange at the top of the formed container and, in order to apply the lid, it is necessary to trim this flange to uniform dimensions.

There are a number of prior art apparatus for shearing or trimming these flanges for this purpose.

An example of such a machine can be seen in Melind, U.S. Pat. No. 3,878,743, wherein the container is placed on a horizontally disposed spindle which is then rotated between stationary and annular cutter elements to effectuate the trimming.

There are also prior art devices in this field wherein the container itself is forced downward by a trimming punch to effectuate shearing of the unwanted flange material.

The principal difficulties encountered with regard to the prior art relate to the fact that due to the motion utilized to effectuate the trimming of the flange, particularly with heavier material such as steel, there is a good likelihood that a burr or jagged edge will develop. With the prior art devices, these burrs usually project upwardly away from the bottom of the can.

This presents a problem which is significant, because these flanges are subsequently rolled over and then receive a lid which carries an annular sealing member secured to the rolled flange to close off the top of the container. With the burrs or jagged edges projecting upwardly, destruction of or damage to the sealing member occurs quite commonly, and an unsatisfactory seal is obtained. Therefore, while the prior art devices will in fact trim the flanges, they do not necessarily effectuate the trimming so that the end product is provided in its most desirable configuration.

SUMMARY OF THE INVENTION

It has been found that while complete elimination of burrs or the like may not be possible or at least difficult, the aforementioned disadvantages of the prior art can be essentially overcome by providing improved trimming apparatus which includes a fixed base and a relatively movable upper die. Secured to the base is a trim punch and matrix capable of receiving the drawn container, with the flange resting on the top edge of the punch.

It has also been found that the movable upper die can be equipped with a trim die movable therewith and a pressure pad which is independently movable in a downward direction and movable with the trim die and the movable die in an upward direction.

It has been discovered that an apparatus constructed in this fashion is capable of permitting the pressure pad to descend to engage a portion of the flange and hold it against the trim punch, following which the trim die will descend shearing the flange in a direction toward the bottom of the container. In this fashion, any irregularities which might occur in the remainder of the flange will project downwardly, thereby presenting no particular problem when the flange is ultimately rolled and engages the top closure member.

It has also been discovered that means can be provided reciprocally within the trim punch and matrix to eject the container following retraction of the trim die and pressure pad, and that a trim die stripper can be provided to eject the trim ring after the trim die has been retracted.

Accordingly, production of an improved container trimming apparatus of the character above described becomes the principal object of this invention, with other objects therefor becoming more apparent upon a reading of the following brief specification, considered and interpreted in view of the accompanying drawings.

OF THE DRAWINGS

BRIEF DESCRIPTION OF THE PREFERRED EMBODIMENT

Figure 1:
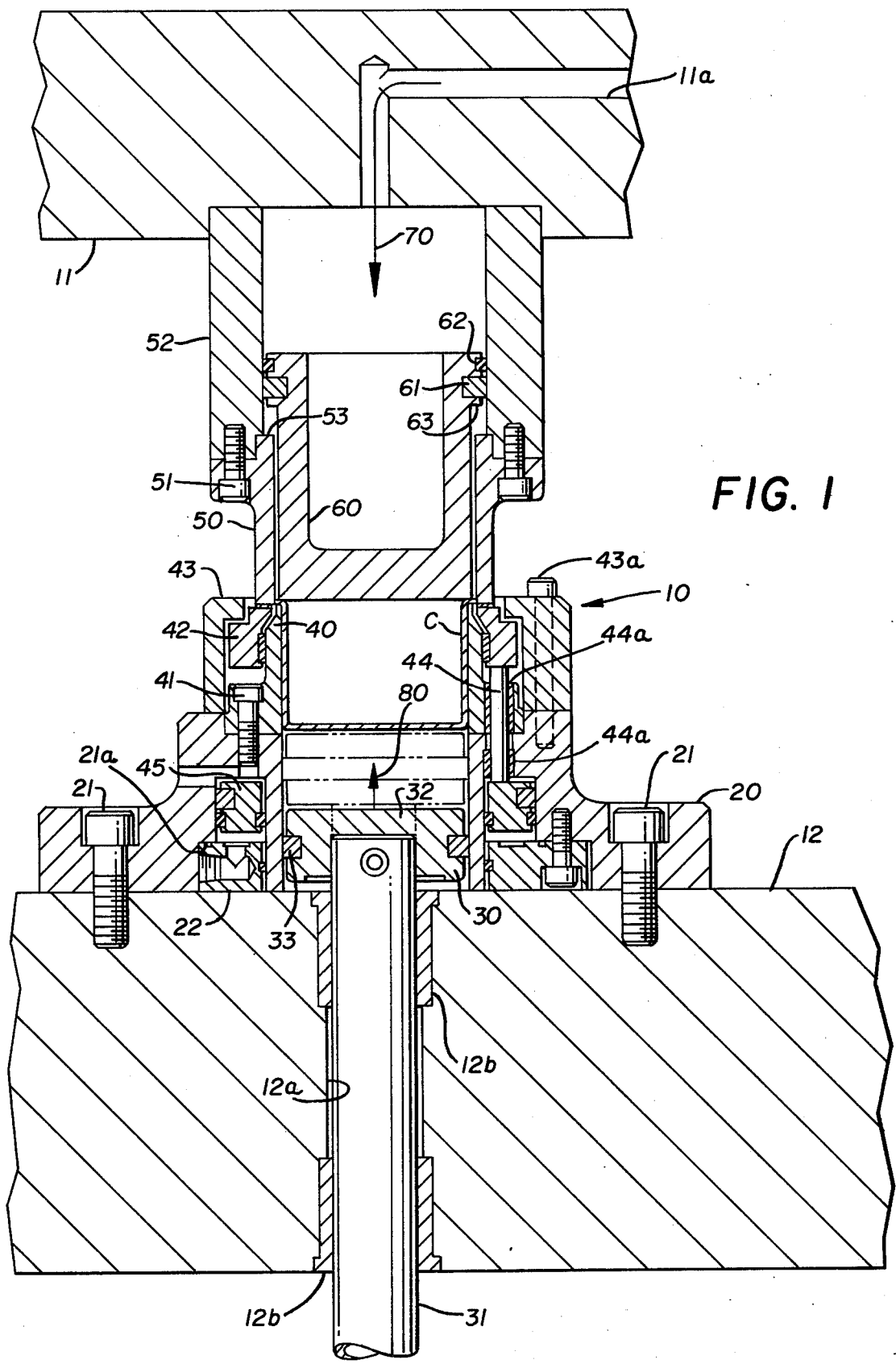
FIG. 1 is an elevational view in section, showing the improved trimming apparatus in the closed position.

Referring first then to FIG. 1, it will be noted that the overall apparatus, generally indicated by the numeral 10, includes a press having an upper movable die 11 and a bottom fixed base member 12. These members have been shown schematically only, since they are believed to be well known in the art of drawing containers.

The actual trimming apparatus includes, in general terms, a matrix block 20, ejection means 30, a trim punch 40, a trim die stripper 42, a trim die 50, and pressure pad 60.

Referring then still to FIG. 1, the base 12 is not shown in any detail since, as noted above, a base member for a drawing operation for forming containers is well known. The base member 12 does, however, have a through bore 12a therein with annular bushings 12b, 12b secured to its inner surface. Ejection means 30 are received in bore 12a and consist of a piston rod 31 and a piston head 32 having a wear ring 33 thereon, as is shown in FIG. 1. The use and operation of this portion of the apparatus will be described in greater detail below.

Still referring then to FIG. 1, it will be noted that a matrix block 20 is secured to the top of the base 12 by means of a plurality of screws 21, 21. A pressure cap 22 is also provided within an annular groove 21a in the bottom of the matrix member, as is an annular trim die piston 45.

Secured to the top of matrix 20 is a hollow trim punch 40. This punch is secured to the top of the matrix by the screws 41, 41, and a trim die stripper 42 is provided around the trim punch 40.

Also associated with the trim die stripper 42 are a plurality of pressure pins 44, each of which seats on the top of the trim die piston 45 and supports trim die stripper 42 having bushings 44a, 44a associated therewith. In the drawings, only one pressure pin 44 is illustrated, but it is understood that a plurality would be employed. Similarly, only one screw 41 is shown securinng the punch 40 to the matrix 20, but it should also be noted that a plurality of these screws also will be employed normally.

Air pressure is provided against the bottom of piston 45 through pressure cup 22 to normally force the piston 45, and thus the trim die stripper 42, away from the base 12. This stripper is held in place by the cylindrical retainer 43 which is bolted to the matrix 20 by screws 43a.

Attached to the upper die 11 is a trim die riser 52, and this riser 52 has the actual trim die 50 secured to its bottom edge by screws 51, 51. In this fashion, the riser 52 and the trim die 50 will move up and down in response to movement of the upper die 11.

Telescopically received within the riser 52 and the trim die 50 is a pressure pad 60 which has wear plugs 61, 61 on its periphery and an annular seal 62 adjacent its upper end. This pressure pad 60 actually operates independently of the upper die and the trim die when the machine is moving in a downward direction, but moves upwardly with the movement of the upper die when it is being retracted. The relative movement of these components will be described more fully below.

Figure 2:
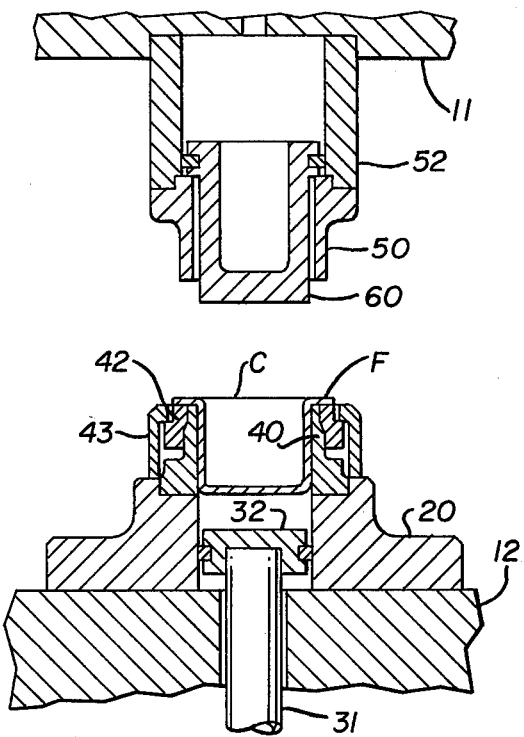
FIGS. 2, 3 and 4 are partially schematic elevational views, showing the various positions of the apparatus during the trimming operation.
Figure 3:
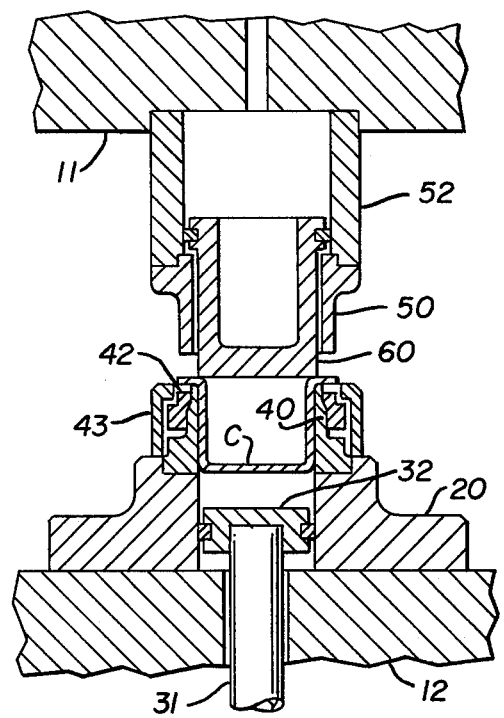

Referring then to FIGS. 1 through 4, for a description of the operation of the device, it will be noted that FIG. 2 represents the initial action and the initial position wherein the container C is in place in the trim punch 40 with the flange or lip F resting on the top surface of the trim punch 40 and trim die stripper 42. At this time, the upper die 11 and the trim die 50 and trim die riser 52 are in the open or retracted position. Also, the stripper 42 has been moved up to the die line, or slightly above it, by air pressure acting on the bottom of the trim die piston 45 which, in turn, forces pressure pins 44, and thus trim die stripper 42, up.

Actuation of the press (not shown) will cause the upper die 11 to move in a downward direction. Simultaneously, pneumatic pressure which is introduced through the conduit 11a in the upper die 11 in the direction of the arrow 70 will begin to actuate pressure pad 60. This will force the pressure pad 60 down so that it comes into contact with the top surface of the flange or lip F trapping it against the top of trim punch 40, as clearly shown in FIG. 3 of the drawings. Continued downward movement of the upper die 11 will bring the trim die 50 into contact with the flange F of the container C, as shown in FIG. 1, trapping it against the top of trim die stripper 42. Further action of the trim die 50 against the trim punch 40 will then shear off the excess flange material S.

At this time, the stripper 42 will also be forced downward overcoming the air pressure on the trim die piston 45 to permit the excess flange material S to be severed from the flange F, as shown in FIG. 1 of the drawings.

Following this, the upper die 11 is withdrawn, and as it moves upward carrying the trim die 50 and die riser 52 with it, the lip 53 formed by the top surface of the trim die 50 will engage the under surface of the lip 63 of the pressure pad, thereby pulling the pressure pad 60 upward along the rest of the upper apparatus and returning the parts to the position of FIG. 2.

Figure 4:
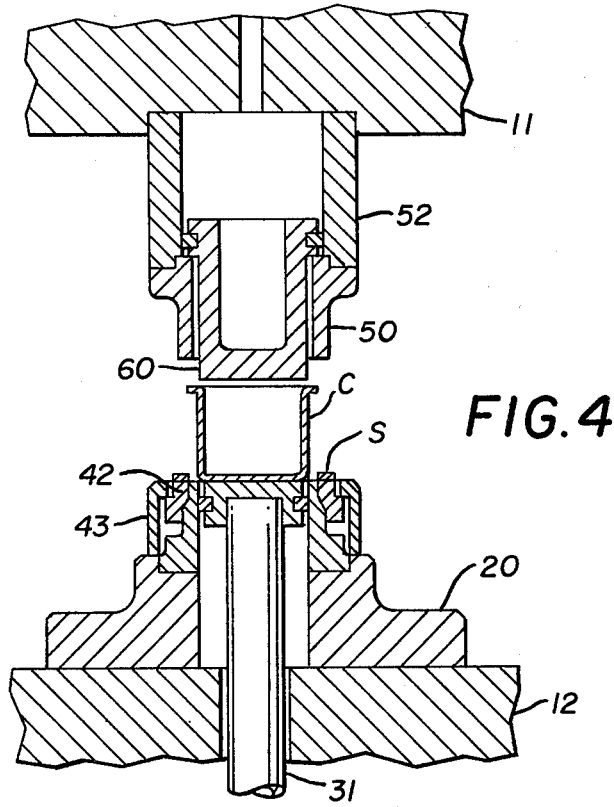

At this time, or simultaneously with the upward movement of the upper die 11, the knockout piston 30 is actuated and moves in the direction of the arrow 80 to eject the container from the matrix 20 and punch 40, as shown in FIG. 4 of the drawings. Also, as soon as the trim die is moved out of engagement with the severed trim rings, the air pressure on piston 45 will force it, and thereby the trim die stripper 42, up to dislodge the trim rings.

Conventional gripping fingers (not shown) will then remove the container C from this station.

Figure 5:
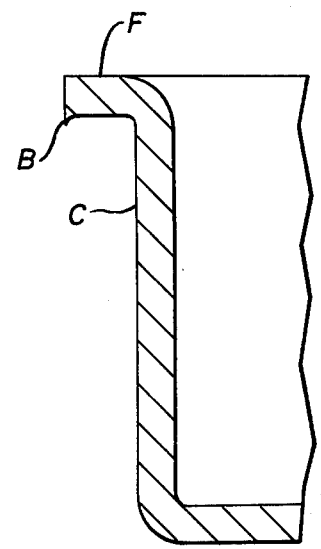
FIG. 5 is a partial sectional view of a typical container following trimming.

FIG. 5 is an enlarged partial sectional view of the container C after the trimming operation, wherein it will be seen that the flange F has a burr B, but this burr is projecting in a downward direction toward the bottom of the container.

As noted earlier, as a practical matter, the flange F is normally rolled under, following which the top closure with its sealing member is applied. The fact that the burr or irregularity or the flange is on the downward side thereof means that once the flange is rolled, it is of no consequence and does not in any way interfere with the sealing properties of the closure member, as is the case with the prior art.

While a full and complete description of the invention has been set forth in accordance with the dictates of the patent statutes, it should be understood that modifications can be resorted to without departing from the spirit hereof or the scope of the appended claims.

What is claimed is:
1. Apparatus for trimming flanges from containers for use with a press having a base and a movable member comprising:
   A. a trim punch secured to said base for receipt of said container;
   B. a trim die stripper
      1. movably secured to said base, and
      2. telescoped over said trim punch and underlying a portion of the flange of said container when the same is received within said trim punch;
   C. a pressure pad carried by said movable member of said press for movement therewith into and out of holding contact with said container; and
   D. a trim die carried by said movable member of said press for movement therewith into and out of trimming engagement with said flange.
2. The apparatus of claim 1, wherein
   A. pressure means are carried by said base for normally urging said trim die stripper away from said base; and
   B. said trim die forcing said trim die stripper toward said base movement of said movable member of said press toward said base.
3. The apparatus of claim 2, wherein
   A. said pressure means includes
      1. a trim die piston disposed beneath said trim die stripper; and
      2. a plurality of elongate pressure pins each having
         a. one end resting on said piston, and
         b. the opposed end supporting said trim die stripper.
4. The apparatus of claim 1, wherein
   A. a knock-out piston is carried by said base for reciprocal movement within said trim die punch.
5. The apparatus of claim 1, wherein
   A. said pressure pad is telescopically received within said trim die; and
   B. means are carried by said movable member for moving said pressure pad toward said base.
6. The apparatus of claim 5, wherein
   A. said pressure pad is elongate and has an outwardly directed flange on one end; and
   B. said trim die is elongate and has a top end engageable with said flange of said pressure pad,

1. whereby said top end of said trim die will engage said flange upon upward movement of said movable member.

7. The apparatus of claim 1, wherein
   A. said trim punch has its outer surface tapered inwardly adjacent its top edge; and
   B. said trim die stripper has its inner surface tapered inwardly adjacent its top edge.

8. The apparatus of claim 1, wherein
   A. a retainer is carried by said base
      1. in encircling relationship with said trim punch and said trim die stripper, and
      2. in partial overlying relationship with said trim die stripper.

9. Apparatus for trimming flanges from containers for use with a press having a fixed base and a top member movable toward and away from said base, comprising:
   A. a hollow container receiving trim punch secured to said base;
   B. a trim die stripper telescoped about said trim punch;
   C. pressure means
      1. carried by said base, and
      2. normally urging said trim die stripper away from said base;
   D. a retainer
      1. secured to said base, and
      2. overlying at least a portion of the top of said trim die stripper;
   E. a trim die carried by said top member of said press for movement therewith into and out of contact with said trim die stripper;
   F. a pressure pad telescopically received within said trim die;
   G. means for moving said pressure pad into contact with said trim punch; and
   H. said pressure pad and said trim die having engageable flanges,
      1. whereby said pressure pad may be moved away from said base upon movement of said top member away from said base.

* * * * *